(12) United States Patent  
Oksanen (10) Patent No.: US 6,742,091 B2  
(45) Date of Patent: May 25, 2004

(54) METHOD OF IMPLEMENTING A DOUBLE-ENDED QUEUE IN A MEMORY AND MEMORY ARRANGEMENT

(75) Inventor: Kenneth Oksanen, Espoo (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 10/015,134

(22) Filed: Dec. 10, 2001

(65) Prior Publication Data

US 2002/0116568 A1 Aug. 22, 2002

Related U.S. Application Data

(63) Continuation of application No. PCT/FI00/00390, filed on May 3, 2000.

(30) Foreign Application Priority Data

Jun. 10, 1999 (FI) .................................................. 991334

(51) Int. Cl.$^7$ .............................................. G06F 12/00
(52) U.S. Cl. ...................... 711/154; 711/147; 711/165; 711/159; 711/133; 711/170
(58) Field of Search ................................. 711/147, 154, 711/165, 159, 160, 133, 134, 117, 122, 170; 710/200

(56) References Cited

U.S. PATENT DOCUMENTS

| | | | |
|---|---|---|---|
| 4,320,455 A | | 3/1982 | Woods et al. ............. 710/200 |
| 5,224,215 A | * | 6/1993 | Disbrow .................. 709/234 |
| 5,442,763 A | * | 8/1995 | Bartfai et al. ............ 710/200 |
| 5,555,396 A | | 9/1996 | Alferness et al. ......... 711/147 |
| 5,801,572 A | * | 9/1998 | Nakamura ................ 327/389 |
| 5,906,658 A | * | 5/1999 | Raz ........................ 710/39 |
| 5,995,967 A | * | 11/1999 | Iacobovici et al. ....... 707/1 |
| 6,374,339 B2 | * | 4/2002 | Iivonen ................... 711/165 |

FOREIGN PATENT DOCUMENTS

EP 0717347 6/1996

OTHER PUBLICATIONS

Schneider et al., "Concepts in Data Structures and Software Development", © 1991, West Publishing Company, pp. 84–91.*

Kruse et al., "Data Structures and Program Design in C", © 1991, Prentice–Hall, Inc., pp. 94 and 106–119.*

"Diamond deque: A simple data structure for priority deques," S.C. Chang and M.W. Du, Information Processing Letters 46 (1993) 231–237, Jul. 9, 1993.

* cited by examiner

*Primary Examiner*—Donald Sparks  
*Assistant Examiner*—Brian R. Peugh  
(74) *Attorney, Agent, or Firm*—Squire, Sanders & Dempsey L.L.P.

(57) ABSTRACT

A method for implementing a double-ended queue (deque) in a memory (MEM), and a memory arrangement. To be able to reduce the amount of copying, particularly in functional environments, the double-ended queue is used in the memory as a hierarchic data structure where on the highest level of hierarchy, there is a three-element node of whose elements one points to the buffer forming the front end of the queue and another to the buffer forming the tail end of the queue. The middle of the queue inlcudes nodes on different levels of hierarchy so that pointing from each level of hierarchy to the next lower level of hierarchy is done by a pointer in the third element of a three-element node. The pointer points to a node on the next lower level of hierarchy which is a similar three-element node, with the exception of the lowest level of hierarchy where the node can also be a buffer, and with the exception of the highest level of hierarchy, where the said pointer can also be a NIL pointer.

11 Claims, 7 Drawing Sheets

—3-tuple

First level

Second level

METHOD OF IMPLEMENTING A DOUBLE-ENDED QUEUE IN A MEMORY AND MEMORY ARRANGEMENT

This is a continuation of PCT/FI00/00390, filed May 3, 2000.

FIELD OF THE INVENTION

The invention relates to implementing a double-ended queue in a memory arrangement. The double-ended queue, also called a deque, is in a way a combination of a queue and a stack, to which elements can be added and from which they can be removed as in a queue and a stack. The solution according to the invention is intended for use particularly in connection with functional memories. Functional memories are memories where updates such as additions are carried out by first copying the path from the root of the tree-like structure to the point to be updated, and updating is then carried out on the copied data (i.e. updating is not carried out directly on the existing data). Such a update method is also called "copy-on-write".

TECHNICAL BACKGROUND OF THE INVENTION

Figure 1:
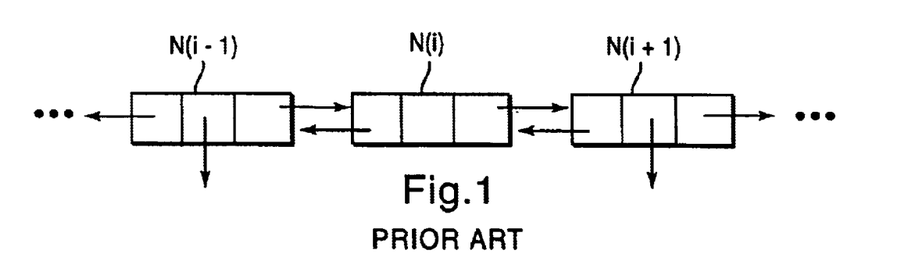
FIG. 1 illustrates a typical method for implementing a FIFO queue.

In overwriting memory environments where updating is not carried out on a copy but on the original data instead (by overwriting), a FIFO (First In First Out) queue, for instance, is implemented using a double-ended list similar to the one shown in FIG. 1. The list consists of three-element nodes in a queue; three such successive nodes are shown in the figure (references N(i−1), Ni and N(i+1)). The elements on the first edge of each node have a pointer to the previous node in the queue, whereas the element on the opposite edge has a pointer to the node next in the queue, and the element in the middle of the node either has the actual stored record or a pointer to the record (the figure shows a pointer).

Such typical implementation of a FIFO queue is, however, rather inefficient e.g. in connection with functional memories, because each update would require copying the entire queue. Therefore, if the queue has for example N nodes, in connection with each update all N nodes have to be copied before carrying out the update operation.

A double-ended queue, however, is a queue where an element can be added to either end or removed from either end. In imperative (overwriting) environments, a double-ended queue can be implemented or realised e.g. as a double-ended linked list. In functional environments, the conventional method is to divide the queue into two lists, the head list and the tail list. The tail list is stored in the memory in reverse order, i.e. the element stored last in the queue is the first element in the tail. Elements are removed from the queue by fetching them up from the head end. If the head list becomes empty, the tail list is turned into a new head list. The amount of processing involved with additions and deductions on such a list is on average constant. In the worst case scenario, however, the amount of processing is linear, meaning that the processing time will increase directly proportional to the amount of data.

When developing new functional memory structures, one should aim at structures which minimise the amount of processing due to memory rupdates. Another important factor is the required memory space which one should try to minimise.

SUMMARY OF THE INVENTION

The objective of the invention is to create a new type of implementation for a double-ended queue, with which the memory in a functional structure can be implemented in such a way that the amount of processing required by memoryupdates, such as copying due to additions, is minimised and also the requirement for memory space is significantly reduced. The set objective is achieved with the method shown in the independent patent claims.

The idea behind the invention is to implement the double-ended queue as a hierarchic data structure consisting of buffers, where the buffers forming the front and tail ends of the queue are at the highest hierarchy level of the structure and where the middle of the queue consists of buffers on adjacent levels of hierarchy in such a way that the elements of a certain level of hierarchy are buffers containing elements of the next higher level of hierarchy (which can in turn be buffers containing elements of the next higher level of hierarchy, etc.). Additions made to the queue and removals from it are always targeted at the buffers forming the front or tail end of the queue. When the buffer in question becomes full as a result of the addition, it is moved to the next lower level of hierarchy as an element of a node (also known as a buffer) on that level, and when the buffer in question becomes empty, a full buffer is fetched up from the next lower level of hierarchy. The elements of the buffers on different levels of the hierarchy, therefore, differ from each other in such a way that if the elements of the buffer on the first level are e.g. integers, then the elements of the buffers on the second level are buffers which contain integers, the buffers on the third level are buffers which contain buffers which contain integers, etc. In other words, additions are made by first filling the buffer forming the front or tail end of the queue and only then moving the full buffer from the subject level to the lower level. Likewise, when removing elements, an empty buffer is replaced by fetching up from the lower level an element which, when brought to the target level, is a buffer filled with elements of the target level.

Each full buffer on different levels of hierarchy contains the same, predetermined number of elements. In other words, a certain maximum has been defined for the number of elements in a buffer. The buffers are always full, with the exception of those forming the front and tail ends of the queue and the top node of each level of hierarchy, the so-called root node, which can be either a full or non-full buffer. However, a buffer can not contain a non-full buffer, because only full buffers are moved from the highest level of hierarchy to the middle of the queue. The queue will not contain any empty buffers either, as empty buffers are replaced with new full ones.

The first full buffer of each level of hierarchy in a data structure forming a queue is transformed into a separate three-field node, a 3-tuple, when a buffer is added (at the highest level) or moved when adding (at lower levels) from a higher level of hierarchy. In this case, the said full buffer is moved to the end of the 3-tuple, and the new buffer formed for the added element or moved buffer is moved to the tail of the 3-tuple. The middle of the 3-tuple is empty to start with, whereas the head and tail of the 3-tuple can never be empty.

Using the above technique, full buffers are moved from one level to another on all levels of hierarchy.

Elements can be added either as the first element of the buffer forming the front end of the queue or, alternatively, as the last element of the buffer forming the tail end of the queue. Similarly, removing is done either by removing the first element of the buffer forming the front end of the queue or, alternatively, the last element of the buffer forming the tail end of the queue. In other words, both the FIFO (First In First Out) and LIFO (Last In First Out) queue disciplines apply in the queue.

When using a solution according to the invention, the operations on the trees of the data structure are primarily carried out at the head or tail of the first level of hierarchy, and the probability for having to visit lower levels of hierarchy with the operation reduces exponentially as we go down the data structure. Due to this, the need to use memory space is reduced and updates are quicker. The time taken for adding and removing elements is, as a rule, constant.

LIST OF FIGURES

In the following, the invention and its preferable embodiments are described in more detail, with references to the examples illustrated in the attached drawings, wherein.

DETAILED DESCRIPTION OF THE INVENTION

To help understand a data structure according to the invention, FIGS. 2a–2k are first used to demonstrate how the structure is created when one starts to add elements to the queue.

Figure 2A:
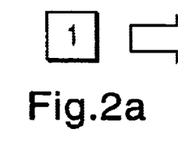
FIGS. 2a–2k illustrate adding an element to a double-ended queue according to the invention.

In the beginning, the queue is empty. The first element is brought to the queue, for instance an integer-type element, and a one-element node is formed (FIG. 2a). The assumption in this example is that the node contains the actual unit of data, but the element in the node can also contain a pointer to the unit of data. When adding another element to the queue (FIG. 2b), a two-element buffer is created, and, further, when adding yet the third and fourth elements (FIGS. 2c and 2d), three- and four-element buffers are created, respectively. The created nodes are buffers, because their elements are arranged sequentially, and only the elements at the ends of the nodes can be added or removed.

Figure 2B:
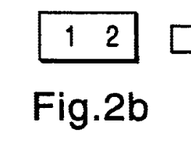
Figure 2C:
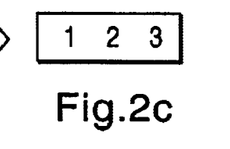
Figure 2D:
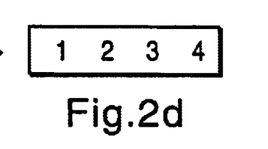

A predetermined maximum, k, is set for the size of the buffer, i.e. the number of elements in it. This example assumes that k equals 4. In such a case, the node in FIG. 2d is a full buffer, because it contains four elements. The buffer has no space for more elements. Adding a new element to the queue will be considered in the following.

Figure 2E:
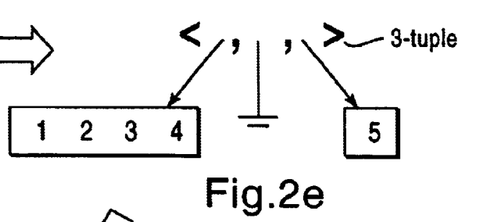
Figure 2F:
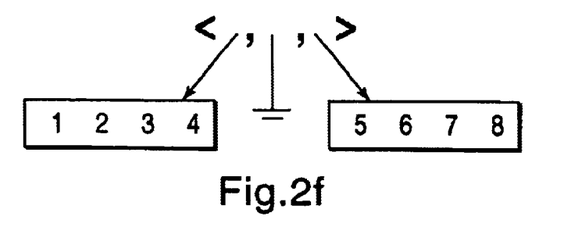

Since the new element can not be added to the buffer, a new buffer is created for it. However, first a three-field node, a so-called 3-tuple, is formed, its fields being the head, the middle and the tail (FIG. 2e). The head, middle and tail of the 3-tuple contain pointers as follows: the pointer in the head points to a full buffer containing elements 1 to 4, the middle is empty, i.e. it contains a NIL pointer and the pointer in the tail points to the new buffer containing the new element 5. The new buffer containing one element is not full, so it is possible to still add three new elements 6, 7 and 8 to it, after which the buffer is full. A situation where the said elements have been added to the buffer is illustrated in FIG. 2f. The buffers in the above-described FIGS. 2a–2f are on the so-called first (hierarchy) level.

Figure 2G:
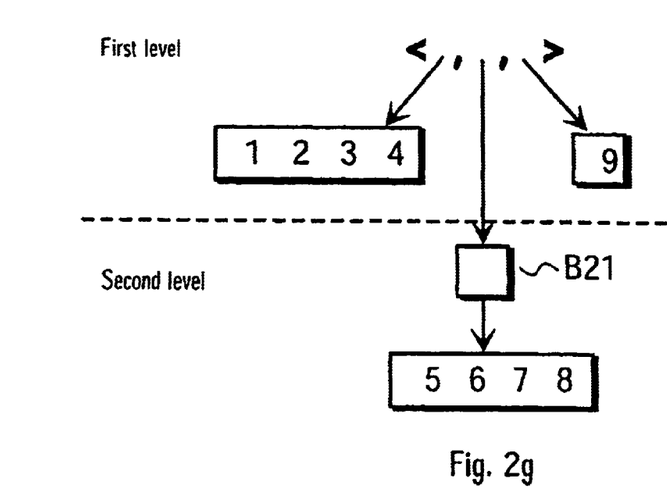

Let us next add element 9 to the queue. Since both buffers, those of the head and tail ends, are full, a new level of hierarchy is formed to the structure by forming a new buffer B21, and a full buffer containing elements 5 to 8 is moved to become its element. A pointer is set in the middle of the 3-tuple to point to this new buffer, and a further pointer is set in the new buffer to point to the full buffer moved from the first level (FIG. 2g). The new buffer B21 on the second level of hierarchy is similar to the buffer in FIG. 2a but, rather than integers, its elements are buffers that contain integers. Since new elements are always added to the first level of hierarchy, the new element 9 is added in the tail of the queue; in other words, a new buffer is formed for element 9, and the tail of the 3-tuple on the first level points to this buffer.

The buffer B21 created on the second level of hierarchy is also the so-called root node of the growing tree on the subject level—a name customarily used for the top node of a tree. A tree-like structure, then, always has a root node as its top node. In addition, parent and child nodes have been defined for tree-like structures, as follows: each node has only one parent node, with the exception of the root node which has no parent; the nearest predecessor of a node is the parent, and the node's descendants are children. A leaf is a node with no children. Nodes which are neither roots nor leaves are called inner nodes. A node on a higher level, a parent node, contains a pointer which points downwards in the structure, i.e. to a child node on the level below.

The buffer B21 in FIG. 2g has now one element, which is a full buffer containing integers and was moved from the previous level. In such a case, i.e. when the buffer pointed by the 3-tuple's middle pointer only contains one element, optimisation will in certain cases be possible by totally omitting the one-element buffer. In the case illustrated by FIG. 2g, this means omitting buffer B21 and setting the pointer in the middle of the first level 3-tuple to point directly to the buffer containing elements 5 to 8.

Figure 2H:
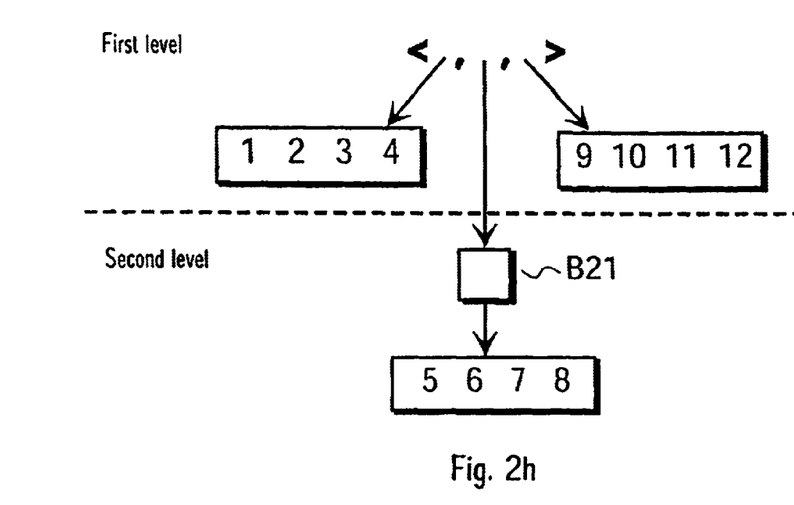
Figure 2I:
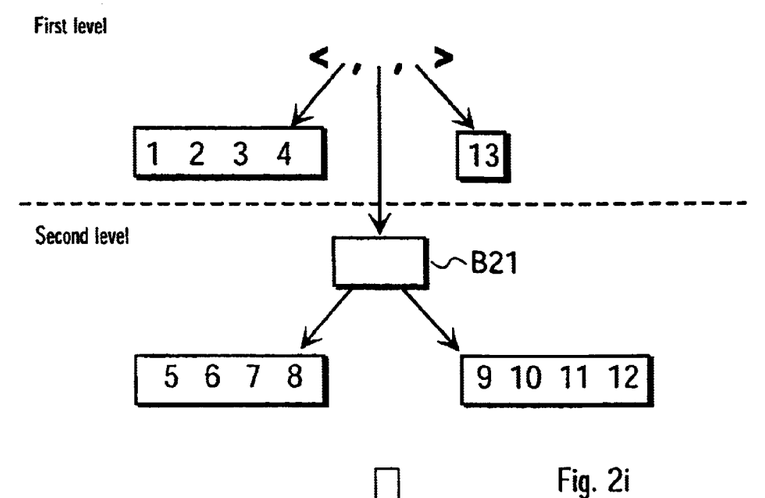

The new elements 10, 11 and 12 can be further added to the one-element first hierarchy level buffer in FIG. 2h in our example before the buffer is full. When element 13 is added, the buffer at the tail is detected to have become full, so the full buffer must be moved to the next lower level. This is done as follows: The first level buffer containing elements 9 to 12, which has become full, is moved to become the last element in the second level buffer B21, which already contains as its element a full buffer containing elements 5 to 8 (FIG. 2i). The second level buffer B21 now contains pointers to two full buffers. Buffer B21 is similar to the first level buffer in FIG. 2b with the exception that the elements in the buffer in FIG. 2b are integers, whereas the elements in buffer B21 are buffers which contain integers. A new buffer will be formed on the first level for element 13, with a pointer in the tail of the first level 3-tuple pointing to it.

Figure 2J:
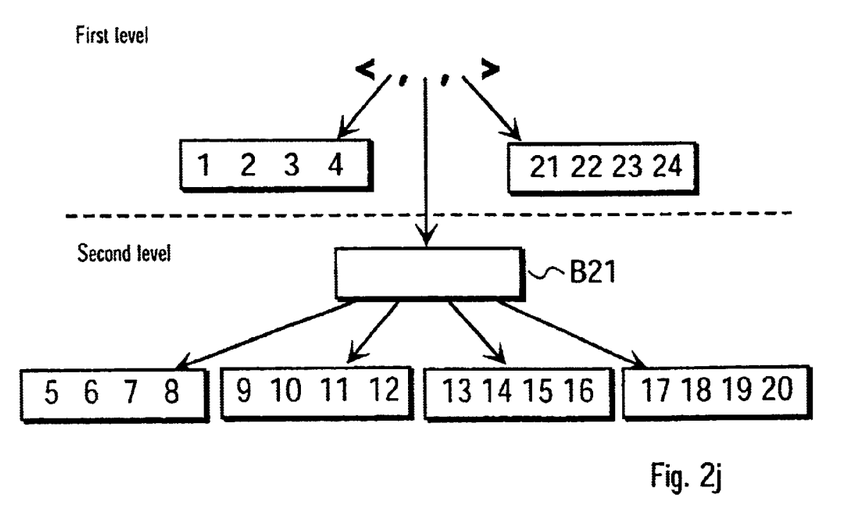
Figure 2K:
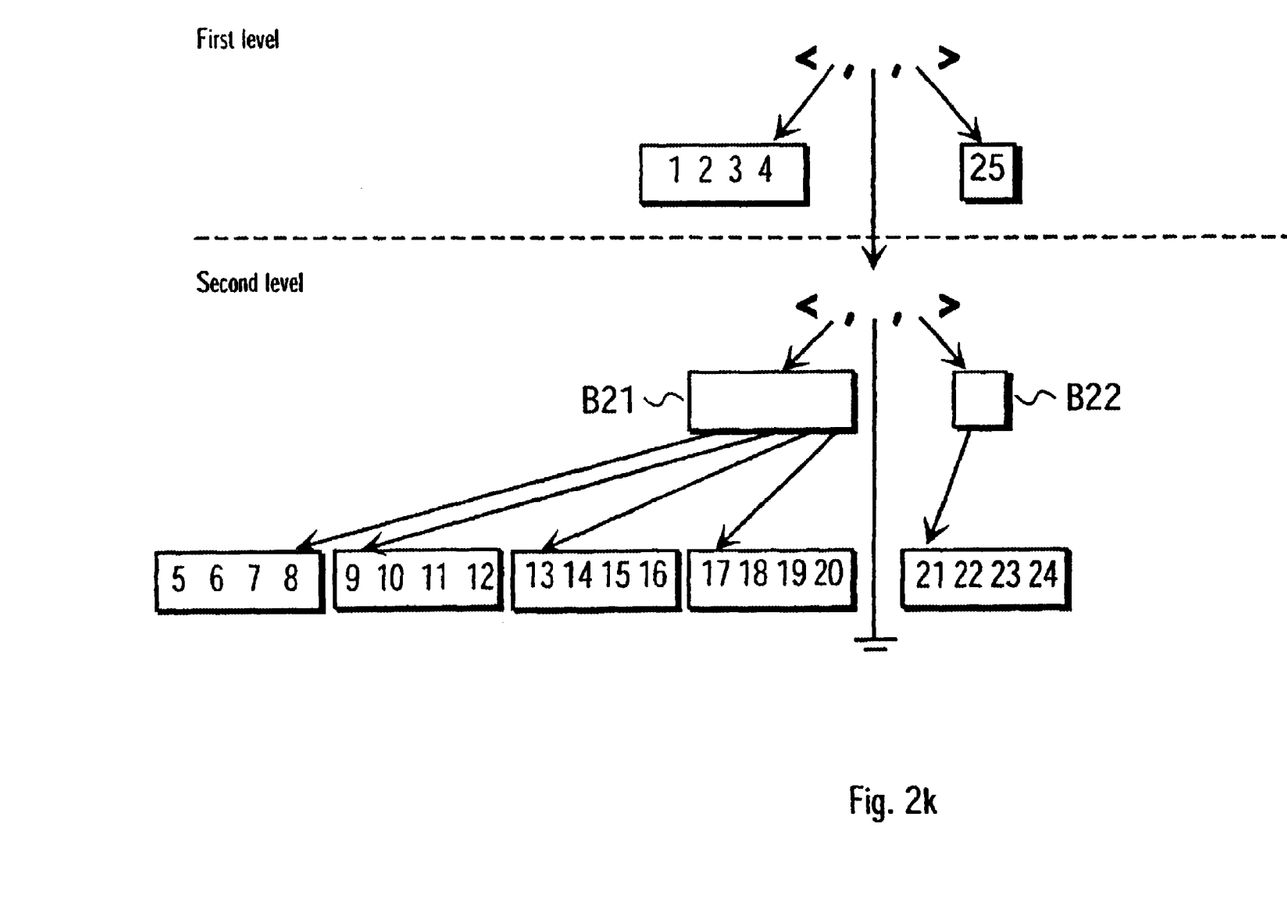

FIG. 2j illustrates a situation where so many elements have been added that the second level buffers are full. When adding a new element, the procedure is similar to that of adding element 5. A 3-tuple is formed on the second level of hierarchy, and a pointer in its head is set to point to the full buffer B21, its middle is empty, i.e. contains a NIL pointer, and a pointer in its tail is set to point to a new buffer B22, which in turn has a pointer to the buffer containing elements 21 to 24 that was moved from the first level of hierarchy and now has become an element of this level (FIG. 2k). A new buffer containing element 25 is formed on the first level, with the tail of the 3-tuple pointing to it.

The double-ended queue grows in the above manner so that the buffers forming its head and tail stay on the highest level of hierarchy and, as a result of adding elements, the middle of the queue grows downwards forming a list of downwards growing trees which can only contain non-full nodes (buffers) at the roots (B21, B22), and never in any other nodes. Each level of hierarchy may contain one or two trees, and the length of the tree on the next lower level of hierarchy is one step longer than on the above level. The list may either end with a buffer or a NIL pointer. The head and tail of a 3-tuple are never empty. This is why the first element of a double-ended queue is either the first element of a buffer or the first element of a buffer pointed by the head of a 3-tuple, and the last element of a queue is either the last element of a buffer or the last element of a buffer pointed by the tail of a 3-tuple.

As discussed above, in the example data structure the different levels handle different types of elements. On the first level of hierarchy, the type handled by each call is T=INT, where INT is an integer. Then, the second level contains a buffer of the integer type, i.e. T=Buffer [INT]. When the data structure continues to grow downwards, the third level type is a buffer containing a buffer of the integer type, i.e. T=Buffer[Buffer[INT]], etc. An element handled by a lower level is a buffer containing elements of the next higher level. The elements of the first level can naturally also be other than integers, e.g. characters, logic constants, etc.

The pseudo code below illustrates adding an element to a queue. The assumption is that the buffers in the queue have already been given adding, reception and removal routines.

```
INSERT-LAST(deque, item)
   if deque=NIL then
      return a buffer containing only item
   elseif deque is a full buffer then
      return <deque, NIL, a buffer containing only item>
   elseif deque is a non-full buffer then
      return deque with item inserted last
   elseif deque is a triple <head, middle,tail> and tail is a full
         buffer then
      return <head, INSERT-LAST(middle, tail), a buffer
         containing only item>
   elseif deque is a triple <head, middle, tail> and tail is a
         non-full buffer then
      return <head, middle, tail with item inserted last>
```

Removing an element is done as follows. Since the queue is double-ended, an element can be removed either from the beginning or the end of the queue. For instance, in the example of FIG. 2*i*, it is possible to remove either element 1 or element 13. Just as when adding, removal is also always done on the first (hierarchy) level and, when the first level buffer is full before the addition or removal, the operation affects the middle of the queue also (with the exception of removing the last element in the queue).

Let us assume that the first element to be removed is element 13, which is the only element in the tail end buffer on the first level. When element 13 is removed, the node becomes empty. However, empty nodes are not permitted, so the buffer turns into garbage. The buffer on the second level in the figure, containing elements 9 to 12, is fetched up to the first level to replace the buffer that became empty. The situation now is as per FIG. 2*h*. Next, we can for example remove elements 12, 11, 10 and 9 which makes the subject buffer empty and, hence, garbage. A buffer containing elements 5 to 8 is fetched up from the second level to the highest level, resulting in the situation in FIG. 2*f*. Buffer B21 becomes empty and turns into garbage, and the pointer in the middle of the 3-tuple that used to point at that buffer turns into a NIL pointer. Removals can be made in reverse order to additions according to FIGS. 2*f*–2*a* until the queue is empty.

However, removals need not be done in the above order, since elements can be removed from the beginning of a double-ended queue also. Naturally, elements can be removed from the queue randomly alternating between its beginning and end, if required.

Figure 3A:
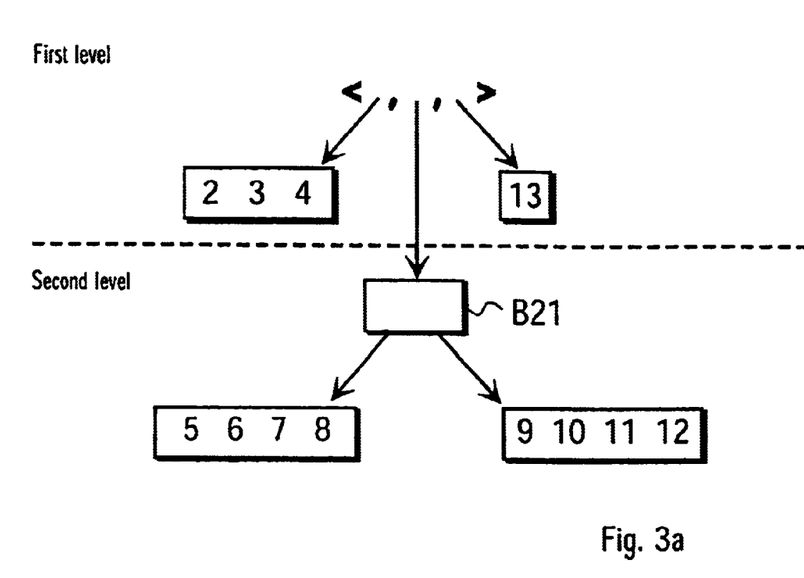
FIGS. 3a–3f illustrate removing an element from a double-ended queue according to the invention.
Figure 3B:
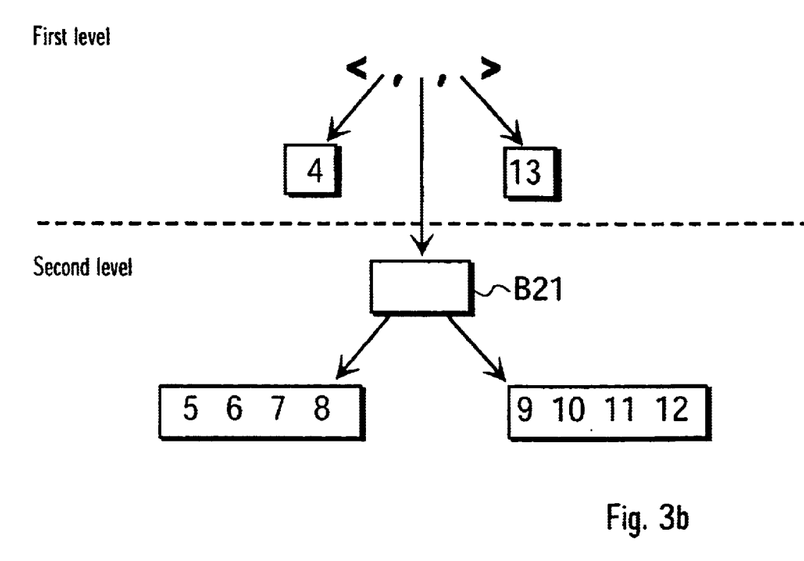
Figure 3C:
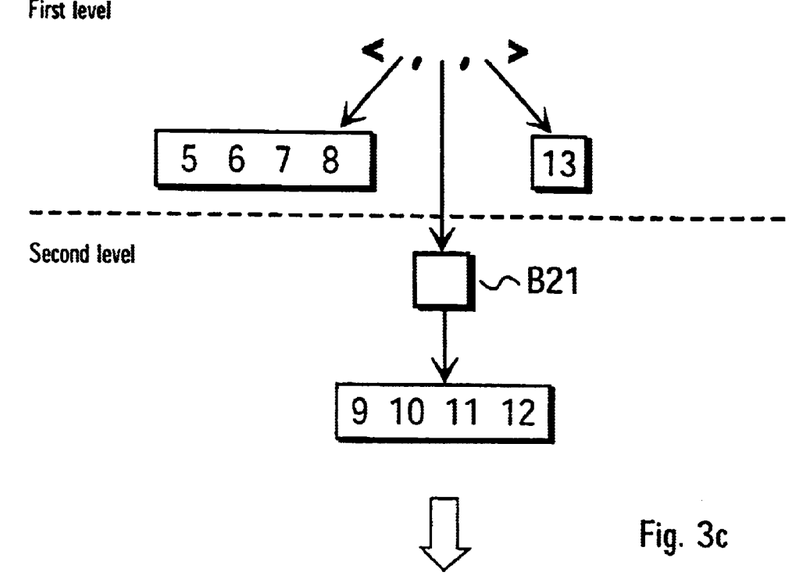
Figure 3D:
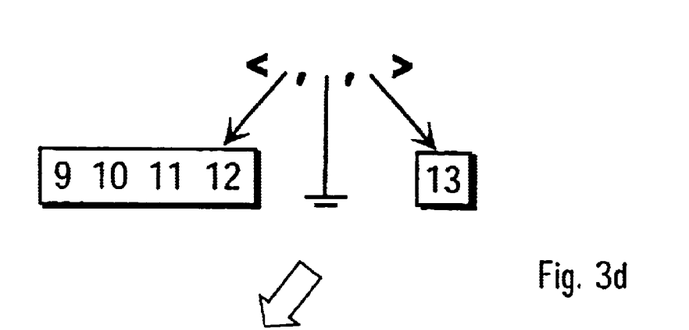
Figure 3E:
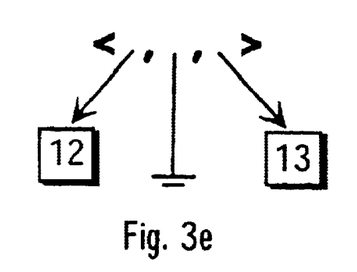
Figure 3F:
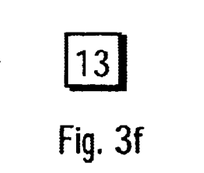

In the following example, elements are removed only from the beginning of the queue. Then, if for example the first element 1 in FIG. 2*i* is removed, the resulting data structure will be as in FIG. 3*a*. When elements 2 and 3 are further removed from the beginning of the queue, the head end buffer of the 3-tuple will only contain element 4 and the situation is as in FIG. 3*b*. When element 4 is removed, the buffer forming the beginning of the queue becomes empty. Empty buffers are not permitted, so an element is fetched up from the second level; this is a buffer containing elements 5 to 8 (FIG. 3*c*). Elements can be removed one at a time from this buffer, by first removing element 5, and thereafter, elements 6, 7 and 8. In accordance with the above, when the buffer is empty, the first element on the second level is fetched up; this is a buffer containing the integer elements 9 to 12. Then, as the second level buffer B21 becomes empty and turns into garbage, buffers only exist on the first level, at the head and tail of the 3-tuple, and the middle of the 3-tuple contains a NIL pointer (FIG. 3*d*). Elements can be further removed from the beginning of the queue by first removing element 9, and thereafter, elements 10 and 11, resulting in a situation as in FIG. 3*e*. As mentioned above, the head and tail of a 3-tuple may not contain empty buffers. In this case, when element 12 (or 13) is removed, the 3-tuple will disappear, leaving behind a one-element buffer (FIG. 3*f*). If even the last element is removed, the buffer turns into garbage.

The pseudo code below illustrates the removal of an element from a queue.

```
REMOVE-FIRST(deque)
   if deque is a buffer containing only one item then
      return NIL
   elseif deque is a buffer containing several items then
      return deque with first item removed
   elseif deque is a triple <head, NIL, tail> and head contains
         only one item then
      return tail
   elseif deque is a triple <head, middle, tail> and head
         contains only one item then
      return <first item in middle, REMOVE-FIRST
         (middle), tail>
   elseif deque is a triple <head, middle, tail> then
      return <head, with the first item removed, middle, tail>
```

Figure 4:
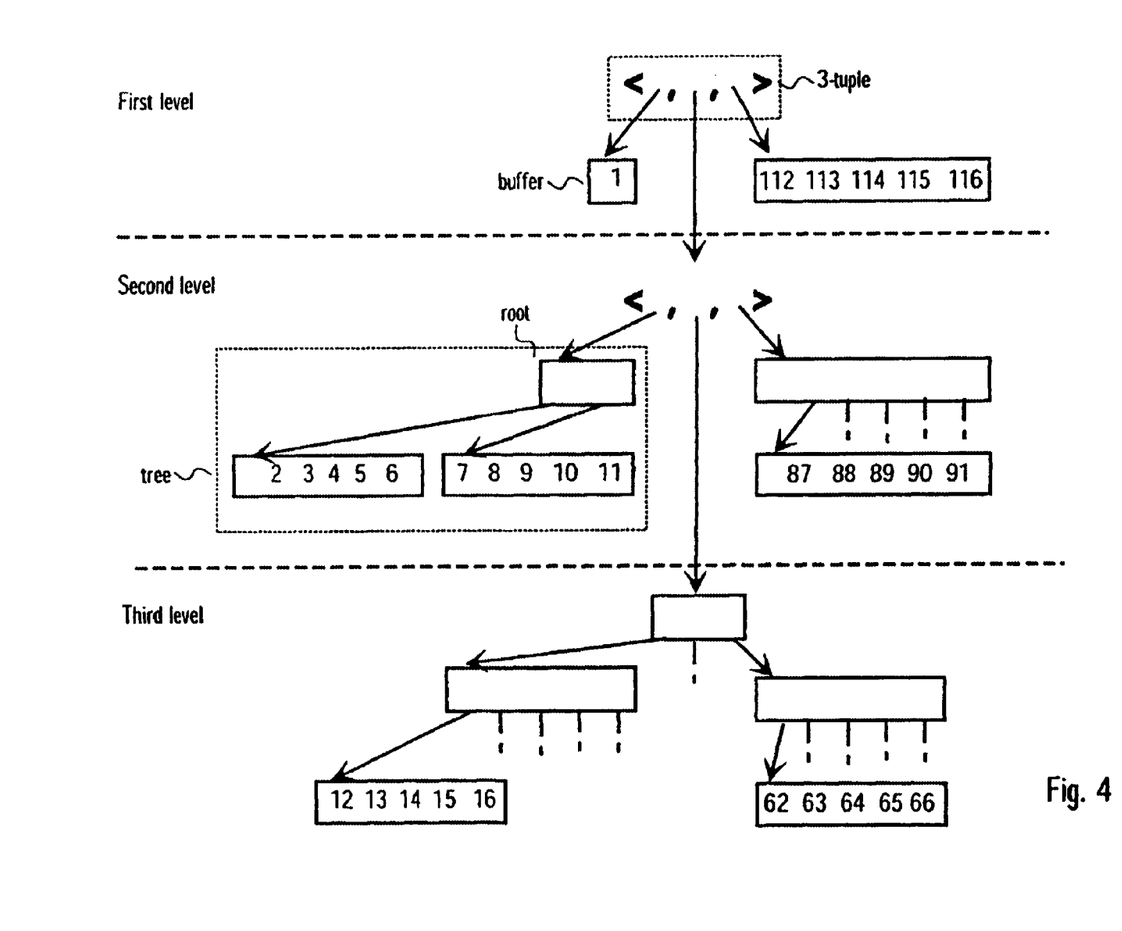
FIG. 4 shows the data structure of a double-ended queue according to the invention.

Next, a double-ended queue according to the invention is discussed as a data structure. FIG. 4 illustrates an example of a data structure according to the invention with three levels of hierarchy and a maximum of five elements in a buffer. The queue can be looked upon as a data structure whose ends are formed of buffers and whose middle is formed of a deque of buffers. When adding an element, a (full) buffer is added to the deque if required, and when removing an element, a (full) buffer is fetched up from the deque to form the end of the queue. In the data structure sense, the middle of a queue according to the invention can also be seen as a list of pairs of trees which extend when going down the list. The 3-tuples form the list by always pointing to the node where the next pair of trees is located.

As discussed above, fewer and fewer visits to the lower levels of the queue will be required. More specifically, this means that the probability of having to visit lower levels when carrying out operations on the queue in the data structure is reduced exponentially when going downwards, and nearly all operations take place on the higher levels and very seldom on the lower levels. The solution according to the invention will, therefore, accomplish a faster and more efficient execution compared with previous solutions in functional structures.

The probability of a buffer becoming full in a data structure according to the invention is 1/k, where k is the predetermined maximum buffer size. The nodes in the queue are always full buffers, with the exception of the nodes at the head and tail of the queue and the root nodes on lower levels of hierarchy, which can either be full or non-full. New nodes and levels are formed in the above-described manner as buffers on the highest level become full. Only full buffers can be moved downwards to lower levels. Therefore, an individual buffer on level i will always contain at least $k^{i-1}$ elements.

When moving full buffers from one level of hierarchy to another in connection with adding (removing) elements to the queue, no copying is necessary. In practice, this results in considerable cost savings.

Adding (removing) new elements always takes place on the highest level. The operation required to add an element on the first level takes c amount of time. Since the probability of having to visit the second level is 1/k, the required operation will take c+(1/k)c, on three levels c+(1/k)c+(1/k)$^2$c, etc. The costs due to updating, therefore, follow the geometrical progression below:

$$\sum_{i=1}^{[\log_k n]} (1/k)^{i-1} c$$

When n increases towards infinity, the progression converges. Hence, even if the worst case performance is logarithmic, the time taken for adding an element to the queue or removing an element from it is on average constant. Then, visits down to longer trees are less and less probable, and on average, a constant time is taken in the solution according to the invention.

Regarding the data structure, the first node on each level, which is being pointed to from the middle element of the higher level 3-tuple, can either be empty or consist of a buffer or of a three-field 3-tuple. The following also applies to the data structure:

the head and tail of a 3-tuple are never empty, a buffer never contains a non-full buffer, when adding a new element, the full head or tail buffer of the 3-tuple is moved to the next lower level, when removing an element, a buffer from the next lower level is fetched up to replace a buffer which has become empty.

As discussed above, the use of buffers speeds up the memoryupdates, since visits to lower levels are required less and less frequently. In addition, solutions according to the invention result in efficient utilisation of memory space, since only the highest level buffers and each tree's root nodes can be non-full buffers.

Even if the invention has in the foregoing been described with references to examples according to the appended drawings, it will be self-evident to professionals in the field that the invention can be modified within the scope of the inventive idea brought forward in the appended patent claims. For example, the size of the buffers in the queue can be other than shown in the examples, as can the number of levels. The internal arrangement of the buffers and 3-tuples may vary. The order of the elements in a 3-tuple may also vary so that the head end, middle and tail end of a queue may be pointed from any element in the 3-tuple.

What is claimed is:

1. A method for implementing a double-ended queue (deque) in a memory where information is stored as data units and each element is allocated its own memory space, in which method data units are added to and removed from the queue according to the LIFO or FIFO principle in such a way that data units are added to or removed from either the beginning or the end of the queue, wherein there is used in the memory on highest level of hierarchy a three-element node having a first element pointing to a first buffer forming a front end of the queue, a second element pointing to a second buffer forming a tail end of the queue, and a third element containing a pointer to a node on a next lower level of hierarchy or a NIL pointer, a middle of the queue is formed of three-element nodes on successive levels of hierarchy, said three-element nodes in the middle of the queue being similar to the three-element node on the highest level of hierarchy and each three-element node in the middle of the queue having first and second elements each containing a pointer to a respective further buffer and a third element containing a pointer to a node on a next lower level of hierarchy, at a lowest level of hierarchy there is used a node, which is a buffer or a three-element node having first and second elements each containing a pointer to a respective further buffer and a third element containing a NIL pointer, adding data units to the queue is done to one of the first and second buffer forming either the front or tail end of the queue, and when the one buffer being pointed to from the elements of a three-element node becomes full, the one buffer is moved to become an element in a third buffer on the next lower level of hierarchy, and removing data units from the queue is done to one of the first and second buffer forming either the front or tail end of the queue, and when the one buffer being pointed to from the elements of a three-element node becomes empty, a full buffer, being an element of a third buffer on the next lower level of hierarchy, is fetched up from the next lower level of hierarchy to replace it.

2. A method according to claim 1, wherein a new level of hierarchy is created in the queue in connection with adding data units by forming a further buffer, the further buffer forming the node of the lowest level of hierarchy and having one element after its formation, the further buffer being either a third buffer in a second highest hierarchy level or a still further buffer in a further hierarchy level, and the further buffer forming the node of the lowest level of hierarchy is pointed to by a pointer contained in the third element of a three-element node on a next higher level of hierarchy, and a full buffer is moved from the next higher level of hierarchy to become an element of the further buffer.

3. A method according to claim 2, wherein the third element of a three-element node is the middle element of the three-level node.

4. A method according to claim 3, wherein buffers of the next higher level of hierarchy which have become full are added as elements to the further buffer thereby the number of the elements of the further buffer increases, until the further buffer becomes full, and the full further buffer is replaced, in connection with the next addition of a data unit, by a three-element node with one of its first and second elements pointing to the full further buffer.

5. A method according to claim 1, wherein the three-element node on the lowest level of hierarchy is replaced by a buffer, if a respective further buffer being pointed to by one of the first or second elements of the three-element node becomes empty.

6. A method according to claim 1, wherein a maximum is predetermined for a number of elements in all the buffers in the queue.

7. A memory arrangement for implementing a double-ended queue (deque), which memory arrangement includes a data structure comprising buffers, wherein the data structure is formed of buffers on several different levels of hierarchy in such a way that a highest level of hierarchy has a three-element node having a first element pointing to a first buffer forming a front end of the queue, a second element pointing to a second buffer forming a tail end of the queue, and a third element containing a pointer to a node on a next lower level of hierarchy or a NIL pointer, a middle of the queue comprises three-element nodes on successive levels of hierarchy, said three-element nodes in the middle of the queue being similar to the three-element node on the highest level of hierarchy and each three-element node in the middle of the queue having first and second elements each containing a pointer to a respective further buffer and a third element containing a pointer to a node on a next lower level of hierarchy, a node at a lowest level of hierarchy is a buffer or a three-element node having first and second elements each containing a pointer to a respective further buffer and a third element containing a NIL pointer, and any buffer on the highest level or on a middle level of hierarchy is treated as an element of a buffer on the next lower level of hierarchy.

8. A memory arrangement according to claim 7, wherein the third element of a three-element node is a middle element of the three-element node.

9. A memory arrangement according to claim 7, wherein only the first and second buffers forming the front and tail end of the queue and further respective buffers pointed to from one of the elements of any three-element node can be non-full.

10. A memory arrangement according to claim 7, wherein buffers do not contain non-full buffers.

11. A memory arrangement according to claim 7, wherein all buffers in the queue have a same, predetermined maximum for their number of elements.

\* \* \* \* \*